May 15, 1928.                                                    1,669,986
L. E. LA BRIE
BRAKE
Filed Aug. 16, 1926

INVENTOR
LUDGER E. LA BRIE
BY
ATTORNEY

Patented May 15, 1928.

1,669,986

UNITED STATES PATENT OFFICE.

LUDGER E. LA BRIE, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed August 16, 1926. Serial No. 129,333.

This invention relates to brakes, and is illustrated as embodied in an internal expanding automobile brake.

An object of the invention is in connection with brakes of the type in which the friction means anchors at one end when the drum is turning in one direction and at the other end when the drum is turning in the other direction, so that it is fully effective whichever direction the drum is turning, and has to do with providing novel applying means for such brakes so arranged that one end of the friction device is forced against the drum before the other end is moved. Thus there is no shifting of the parts when the drum is rotating in its normal direction, although such shifting may take place to reverse the brake when the direction of rotation of the drum is reversed.

In one desirable arrangement, the brake is applied by a cam which normally acts to move only the one end of the friction device, but which can shift with the friction device in the reversal of the brake. Preferably the cam has only one lobe,—i. e. it has a concentric part engaging the normally-anchored end of the friction device, and an eccentric part engaging the other end. The brake-applying thrust on the cam is away from the normally-anchored end and aids in confining the initial movement to the said other end.

Other features of the invention relate to a novel spring centering device carried by an intermediate part of a continuous friction band, and to various other novel combinations of parts and desirable particular constructions which will be apparent from the following description of the illustrative embodiment shown in the accompanying drawing, in which.

Figure 1:
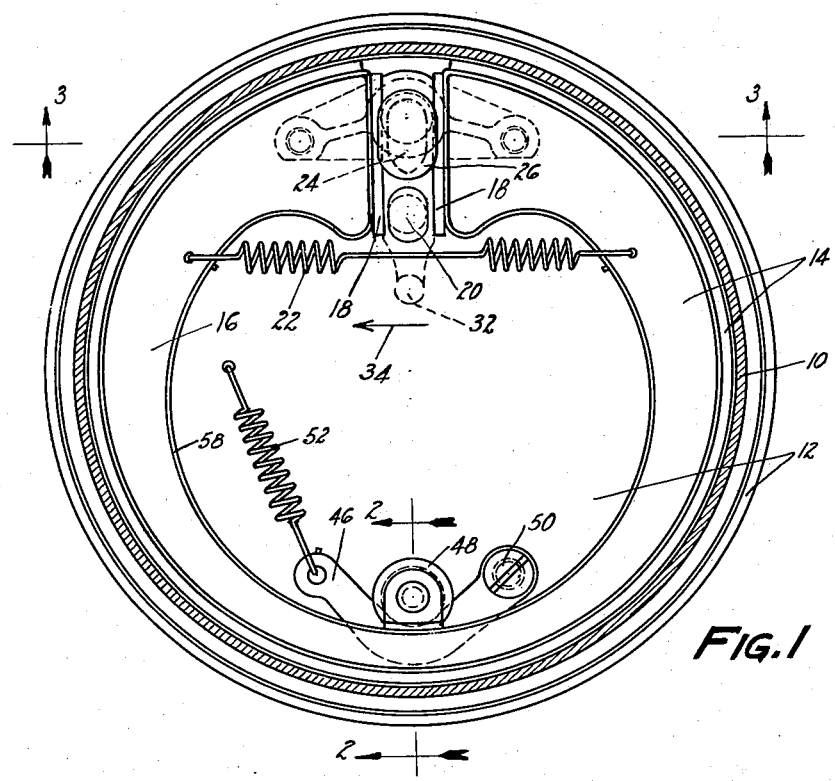
Figure 1 is a vertical section through the brake, just inside the head of the brake drum.

The brake selected for illustration includes a drum 10 rotating with a wheel (not shown), at the open side of which is a suitable support such as a backing plate 12.

Within the drum is a novel floating friction device shown as a continuous band 14, preferably made up by securing back to back two L-section stampings so that their radial flanges jointly form a stiffening web 16. At its ends the friction device is provided with cam-engaging thrust plates 18.

The torque of the brake is taken from the clockwise end of the friction device 14 when the drum is turning clockwise, and from the counter-clockwise end when the drum is turning counter-clockwise, by anchoring means such as an adjustable cam 20, and toward which those ends are urged by the return spring 22. A friction device of this character is fully effective in either direction of rotation of the brake drum.

The drum in Figure 1 is intended for normal rotation in a counter-clockwise direction, that being the direction of rotation when the automobile is moving forward. An important feature of the present invention, therefore, relates to so arranging the brake-applying means that the counter-clockwise end of the friction device 14 is not forced away from anchor 20 when the brake is applied, so that shifting of the parts only takes place on those rare occasions when the brake is applied with the automobile moving backward, at which times drum 10 is rotating in a clockwise direction.

When the parts have shifted, in applying the brake with the automobile moving backward, the return springs move them back to their initial positions when the brake is again released.

In the illustrated brake, the applying means includes a one-lobed cam 24, that is, a cam having a concentric or cylindrical portion engaging the counter-clockwise end of the friction device and an eccentric portion engaging the clockwise end. The cam is shown with an end flange 26 laterally confining the ends of the friction device.

Cam 24 is integral with, or carried by, a camshaft 28 journalled in a support or bracket 30, the camshaft being rocked to apply the brake by an arm or lever 32, on which the brake-applying thrust comes in the direction of the arrow 34,—i. e. in the direction of the end of the friction device acted on by the eccentric portion of cam 24. Thus the thrust on arm 32 merely accentuates the tendency to force the clockwise end of the friction device against the drum without moving the counter-clockwise end away from anchor 20.

Support or bracket 30, in which the cam-shaft 28 is journalled, has bosses 36 projecting through relatively large openings 38 in the backing plate, and carrying studs 40 on which are threaded nuts 42 holding washers 44, on the outside of the backing plate, against the ends of bosses 36. This arrangement permits the support and cam and shaft to shift freely with the friction device when it anchors at its counterclockwise end when the automobile is in reverse at the time the brakes are applied. As the cam engages both ends of the friction device, the shifting of the bracket, as described, permits the cam to exert a spreading action in reverse which is substantially the same as its action when the automobile is going forward, except that the resultant of the shifting and turning is to cause the cam to turn, in effect, about an axis near its lower end.

Figures 2, 3:
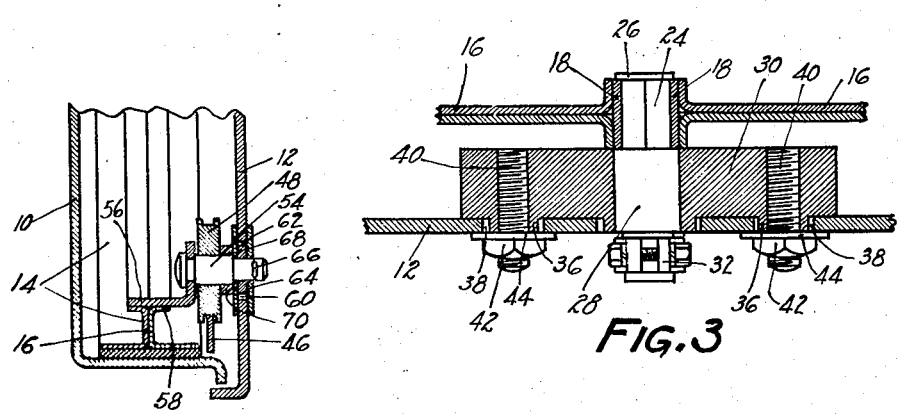
Figure 2 is a partial radial section on the line 2—2 of Figure 1, showing the novel centering device.
Figure 3 is a partial section on the line 3—3 of Figure 1, showing the shiftable cam support.

The friction device 14 is yieldingly centered in a predetermined idle position when released, by novel means shown in Figures 1 and 2, and including as one element a lever 46 having a double wedge surface embracing a grooved roller 48. One end of the lever 46 is fulcrumed on a pivot 50 carried by the backing plate, and the other end is urged upwardly by a tension spring 52. When the brake is released after it has been applied in reverse, spring 22 shifts the bracket 30 and cam 24 back to their initial positions.

Roller 48 is carried by a pivot or part 54 carried by a stamped bracket 56 welded or otherwise secured to short lateral stiffening flanges 58 projecting in opposite directions from the flanges forming web 16. Part 54 projects through a relatively large opening 60 in the backing plate 12, and carries members such as washers 62 and 64 engaging opposite sides of the backing plate and holding the friction device against lateral movement. Washers 62 and 64 are held by means such as a cotter pin 66, and are separated by a spacer 68 of a thickness equal to the thickness of the backing plate. Washer 64 is spaced from roller 48 by a spacer 70, which may be a spring washer of rubber or the like to prevent rattle. The idle position of the friction device vertically of the drum is determined by engagement of spacer 68 with the top of opening 60.

While one illustrative embodiment has been described in detail, it is not my intention to limit the scope of the invention to that particular embodiment, or otherwise than by the terms of the appended claims.

I claim:

1. A brake comprising, in combination, a drum, a friction device engageable with the drum and anchoring at one end when the drum in turning in one direction and at the other end when the drum is turning in the other direction, a brake-applying device acting without shifting tangentially of the brake to force one of said ends against the drum without moving the other of said ends, and a support permitting the brake-applying device to shift with the friction device when the drum is turning in a direction to cause anchoring of said one end.

2. A brake comprising, in combination, a drum, a friction device engageable with the drum and anchoring at one end when the drum is turning in one direction and at the othed end when the drum is turning in the other direction, an eccentrically-pivoted brake-applying cam engaging said ends and acting to force one of said ends against the drum without moving the other of said ends, and a support permitting the brake-applying cam to shift with the friction device when the drum is turning in a direction to cause anchoring of said one end.

3. A brake comprising, in combination, a drum, a friction device engageable with the drum and anchoring at one end when the drum is turning in one direction and at the other end when the drum is turning in the other direction, and a floating brake-applying cam having a concentric portion engaging one of said ends and an eccentric portion engaging the other of said ends.

4. A brake comprising, in combination, a drum, a floating friction device engageable with the drum and having adjacent ends, anchoring means adjacent said ends, means yieldingly urging said ends against the anchoring means, and a floating brake-applying cam having a concentric portion engaging one of said ends and an eccentric portion engaging the other of said ends.

5. A brake comprising, in combination, a drum, a friction device engageable with the drum and anchoring at one end when the drum is turning in one direction and at the other end when the drum is turning in the other direction, a cam-shaft adjacent said ends, an operating arm on the shaft, a one-lobed cam engaging said ends and arranged on the same side of the shaft as said arm, and a support for the cam and shaft mounted for automatic shifting movement as the friction device anchors at one end or the other.

6. A brake comprising, in combination, a drum, a friction device engageable with the drum and anchoring at one end when the drum is turning in one direction and at the other end when the drum is turning in the other direction, a cam-shaft adjacent said ends, an operating arm on the shaft, a one-lobed cam engaging said ends and operated by said shaft, and a support for the cam mounted for automatic shifting movement as the friction device anchors at one end or the other.

7. A brake comprising, in combination, a drum, a friction device engageable with the drum and anchoring at one end when the drum is turning in one direction and at the other end when the drum is turning in the other direction, a cam-shaft adjacent said ends, an operating arm on the shaft, a cam on the shaft engaging said ends, a floating support for the shaft mounted to shift along a chord of the drum, and brake-applying means acting on said arm and through said arm applying thrust to the cam and support to cause one end of the friction device to be forced against the drum before brake-applying movement of the other end begins.

8. A brake comprising, in combination, a drum, a friction device engageable with the drum and anchoring at one end when the drum is turning in one direction and at the other end when the drum is turning in the other direction, a cam-shaft adjacent said ends, an operating arm on the shaft, a cam on the shaft engaging said ends, a floating support for the shaft having pin-and-slot movable connections on opposite sides of the shaft, and brake-applying means acting on said arm and through said arm applying thrust to the cam and support to cause one end of the friction device to be forced against the drum before brake-applying movement of the other end begins.

9. A brake comprising, in combination, a drum, a floating continuous band within said drum, means acting on the ends of said band to expand it against the drum, and a yieldingly operated wedge acting on the band substantially at its center and urging it toward a predetermined initial position.

10. A brake comprising, in combination, a drum, a floating continuous band within said drum, means acting on the ends of said band to expand it against the drum, a centering lever acting on the band substantially at its center and urging it toward a predetermined initial position, and a spring tensioned by movement of the lever when the brake is applied with either end of the band anchored.

11. A brake including a continuous band carrying a roller, in combination with a lever fulcrumed at one end and having a double wedge surface embracing the roller, and a tension spring connected to the free end of the lever.

12. A brake including a friction device having two flanges jointly forming a stiffening web, a bracket secured to both flanges and carrying a roller, in combination with a lever fulcrumed at one end and having a double wedge surface embracing the roller, and a tension spring connected to the free end of the lever.

13. A brake including a friction device and an adjacent backing plate having an opening, in combination with a bracket fixedly secured to the friction device having a part projecting through the opening, centering means acting on said part, and positioning means on said part engaging opposite sides of the backing plate.

14. A brake including a friction device and an adjacent backing plate having an opening, in combination with a bracket fixedly secured to the friction device having a pivot projecting through the opening, a roller for a centering device mounted on said pivot, and positioning means on said pivot engaging opposite sides of the backing plate.

15. A brake comprising, in combination, a friction device having two flanges jointly forming a stiffening web, a backing plate adjacent the friction device having an opening, a device fixedly secured to said two flanges and projecting through said opening, and members carried by said device on opposite sides of the backing plate to prevent lateral movement of the friction device.

16. A brake comprising, in combination, a friction device having a stiffening web, a backing plate adjacent the friction device having an opening, a device fixedly secured to said web and projecting through said opening, and members carried by said device on opposite sides of the backing plate to prevent lateral movement of the friction device.

17. A friction device for a brake having a stiffening web with oppositely-projecting lateral flanges at its edge, and a bracket forming part of positioning means for said device and which has a part overlapping and secured to said flanges.

In testimony whereof, I have hereunto signed my name.

LUDGER E. LA BRIE.